(No Model.)
2 Sheets—Sheet 1.

J. B. BIRDSELL.
GRAIN SEPARATOR.

No. 278,082. Patented May 22, 1883.

WITNESSES
N. S. Wright,
J. Edward Warren

INVENTOR
J. Benjamin Birdsell
By W. W. Leggett,
Attorney (No Model.) J. B. BIRDSELL. 2 Sheets—Sheet 2.
GRAIN SEPARATOR.

No. 278,082. Patented May 22, 1883.

Witnesses.
Robert Everett,
George W. Rea.

Inventor:
J. B. Birdsell.
By W. W. Leggett,
Atty.

UNITED STATES PATENT OFFICE.

J. BENJAMIN BIRDSELL, OF SOUTH BEND, INDIANA.

GRAIN-SEPARATOR.

SPECIFICATION forming part of Letters Patent No. 278,082, dated May 22, 1883.

Application filed August 15, 1882. (No model.)

*To all whom it may concern:*

Be it known that I, J. BENJAMIN BIRDSELL, of South Bend, county of St. Joseph, State of Indiana, have invented a new and useful Improvement in Grain-Separators; and I declare the following to be a full, clear, and exact description of the same, such as will enable others skilled in the art to which it pertains to make and use it, reference being had to the accompanying drawings, which form a part of this specification.

My invention consists in the combinations of devices and appliances hereinafter specified, and more particularly pointed out in the claims.

Figure 1:
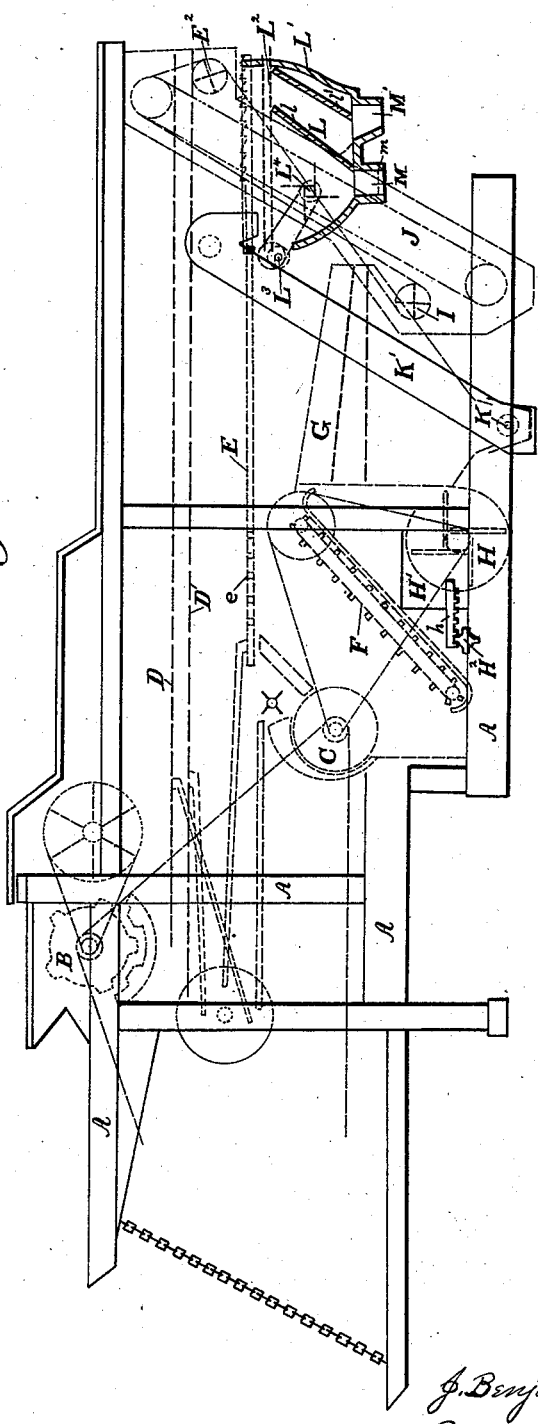
Figure 2:
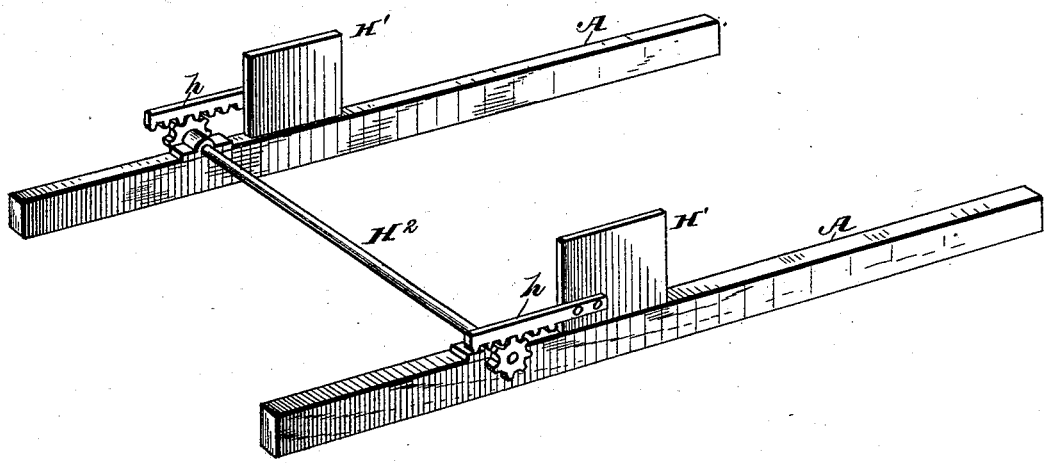

In the drawings, Figure 1 is a side elevation of a device embodying my invention, representing in dotted lines the interior mechanism and the recleaning apparatus in section; and Fig. 2 is a detail view in perspective, showing the blinds or shutters and their operating mechanism.

My invention is especially designed as an improvement on my combined clover thrashing and hulling machine, for which Letters Patent were granted to me March 21, 1882, No. 255,097.

In carrying out my invention, A indicates the side sills of the frame-work; B, the thrashing and C the hulling cylinder.

D and D' are the ordinary separating-bolts.

E is a shaking ratchet floor or conveyer, preferably made straight and tight along the greater portion of its length. $e$ is a perforated metal plate or screen, preferably located at the forward end of said floor; but I do not wish to confine myself to any given location of said screen therein. The purpose of said perforated metal plate or screen being located in said shaking floor is to separate the seed that has passed through the hulling-cylinder, and, with the tailings, passed into the spiral conveyer I and returned by the elevator J and the spiral conveyer $E^2$ upon the shaking floor, so that the seed so separated shall not be returned to the hulling-cylinder a second time, but passed through said screen $e$ upon the shoe G and to the small spiral conveyer K, where it is passed to elevator K', by which it is elevated into the recleaning attachment L. By this means all liability of breaking such seed is wholly obviated, as would otherwise result should the seed, unprotected by the chaff in which it is originally inclosed, be again passed through the hulling-cylinder.

F represents the riddles, which deliver the seed and chaff upon the sieves of the shoe G.

H is an ordinary fan. H' represents the blinds or shutters thereto. For the purpose of making said blinds equally adjustable backward and forward upon either side of the machine, I provide the machine with a shaft, $H^2$, which extends continuously from side to side of the structure, and is provided at each end with a pinion. Each pinion engages a rack-bar, $h$, secured to the blind or shutter, at opposite sides of the fan, in such manner that both blinds or shutters can be simultaneously and uniformly adjusted by hand from either side of the machine, and when so adjusted by hand will remain fixed in their adjusted position upon the side sills, A, or other supporting part in the same relative position with respect to the fan, thereby evenly controlling the admission of air by simple and efficient means.

The small conveyer K is located underneath the sieves in the shoe G, and is operated by a belt in the ordinary manner.

The elevator K' is constructed to carry the partially-cleaned seed from the conveyer K into the recleaning attachment L. This attachment is constructed of a suitable case, L', inclosing one or more sieves, $L^2$, preferably of perforated sheet metal, which are made to suitably vibrate longitudinally by means of an eccentric shaft, $L^3$, to which they are attached.

$L^4$ is a fan operated in any proper manner.

$l$ is a dividing-board, whereby the wind is shut off from the rear of the sieves and properly directed through the screens, and which also serves to guide the good seed into the spout M.

$l'$ is another dividing-board, whereby the shrunken and foul seed is guided into the spout M'. The spouts are so constructed that they are adapted to discharge the seed into sacks secured thereto. The spout M is preferably constructed with a sand-screen, $m$, adapted to pass the seed over it and the sand through it upon the ground. It is evident that, in consequence of the wind being shut off from the rear of the sieves by the dividing-board $l$, the light and foul seed will not be blown over the end of the sieves, but will fall into the spout M', so that should there be by any possibility any good seed carried over the dividing-board $l$ it will be secured in the spout M′, while the dirt and chaff will pass entirely off the screens to the rear.

Heretofore the shrunken and foul seed has been carried into the chaff, as already observed, giving the appearance, at least, of waste. By my device, however, this difficulty is entirely obviated.

The recleaning attachment L is constructed separate from the rest of the machine, and is thus adapted to be secured to any machine whenever desired.

It is evident that the device for adjusting the blinds or shutters of the fan will work equally well in either a grain or clover thrasher. I would have it understood that I do not confine myself to its use in a clover-thrasher alone.

What I claim is—

1. The combination, with the fan, its movable blinds or shutters, and the side sills, of a through-shaft, a pinion secured to its ends at each side of the machine, and a rack-bar secured to each blind or shutter and engaging one of the pinions, whereby both blinds and shutters are positively and simultaneously adjusted by hand from either side of the machine, and when adjusted remain fixed in such position, substantially as described.

2. In a combined clover huller and thrasher, the combination, with the thrashing-cylinder and separating-bolts, of the shaking conveyer-floor provided with a perforated screen, a shoe located beneath the floor for receiving the seed therefrom, a conveyer arranged below the shoe, an elevator for taking the seed from the conveyer and carrying it upward to the rear end of the floor, and a conveyer at the upper end of the elevator for receiving the seed therefrom and delivering it back to the floor, substantially as described.

3. The combination, in a grain or clover thrasher and huller, of the separating-bolts, the shaking floor provided with a screen and arranged beneath the bolts, a hulling-cylinder under said floor, elevating devices for raising the seed, after passing through the huller, back to the vibrating floor, the shoe for receiving the seed from the screen in the shaking floor, the recleaning apparatus, and means for elevating and delivering the seed to the recleaning apparatus, substantially as described.

In testimony whereof I sign this specification in the presence of two witnesses.

J. BENJAMIN BIRDSELL.

Witnesses:
SARAH M. WHINERY,
N. S. WRIGHT.